Jan. 23, 1962 L. A. KAMENTSKY 3,018,471
CHARACTER RECOGNITION SYSTEM
Filed July 19, 1960 5 Sheets-Sheet 1
FIG. 1
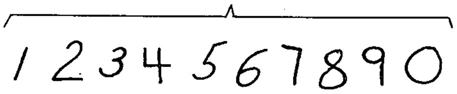
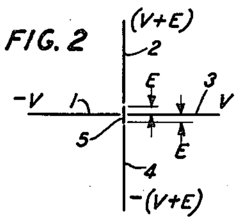
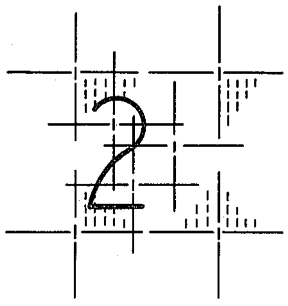
FIG. 2A
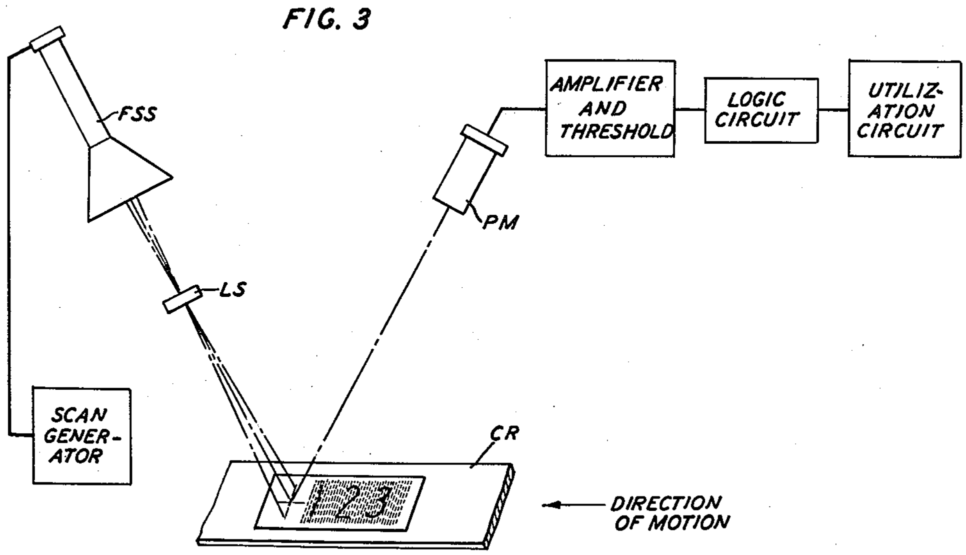
FIG. 9
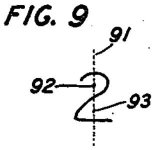
FIG. 8
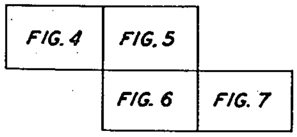
INVENTOR
L. A. KAMENTSKY
BY John K. Mullarney
ATTORNEY INVENTOR
L. A. KAMENTSKY
BY John K. Mullarney
ATTORNEY INVENTOR
L. A. KAMENTSKY
BY John K. Mullarney
ATTORNEY INVENTOR
L. A. KAMENTSKY
BY John K. Mullarney
ATTORNEY INVENTOR
L. A. KAMENTSKY
BY
John K. Mullarney
ATTORNEY 3,018,471
CHARACTER RECOGNITION SYSTEM
Louis A. Kamentsky, Plainfield, N.J., assignor to Bell Telephone Laboratories, Incorporated, New York, N.Y., a corporation of New York
Filed July 19, 1960, Ser. No. 43,820
9 Claims. (Cl. 340—149)

This invention relates to pattern recognition systems and more specifically to apparatus for automatically reading printed and handwritten characters.

Many systems have been proposed heretofore for automatically reading printed alphabetical letters and Arabic numerals (hereinafter referred to as alpha-numeric characters). All of these systems, however, are subject to one or more disadvantages. For example, many of the priorly known systems require accurate positioning of the characters in a scanning field to obtain reliable character recognition. Any misalignment or misplacement of the character within the scanning field will produce erroneous output signals. Some of the systems of the prior art are unable to recognize conventional alpha-numeric characters. The characters to be recognized by these systems must be formed in an unconventional manner which, of course, detracts from their legibility to the human eye. Other known prior art systems which recognize characters of conventional configuration have rigid requirements upon the formation of the characters. In these systems, errors will result in the automatic recognition of the characters if the characters do not precisely conform to a predetermined type font. In general, in these systems, any variation in style, orientation, size or shape of the characters will cause erroneous output signals to be produced.

In one type of character recognition system which may be termed element matching, the field of the character is divided into an array of discrete elements and each element is quantized black or white. In this type of character recognition system where the type and location of the black and white elements of the character field are compared with a standard stored in a permanent memory to determine the identity of the character, a considerable amount of redundant information is obtained. This redundancy of information unnecessarily complicates the logic required to make the identification and, of course, increases the cost and complexity of the character recognition system. In many of the prior art systems the logic required to recognize a printed alpha-numeric character approaches the size and complexity of a modern high speed electronic computer.

With the advent of the modern high speed data processing systems it is imperative that a character recognition system which will operate at a compatible speed be provided to enter alpha-numeric information into the data processing system. A serious disadvantage of the prior art systems is their inability to operate at speeds which will enable these data processing systems to process data at their full capabilities.

One further disadvantage of character recognition systems of the prior art has been their inability to recognize handwritten alphabetical letters and Arabic numerals. Because of the variations in size, shape, and orientation between alpha-numeric characters hand written by one person and those hand written by another, the prior art character recognition systems have not been able to recognize these handwritten characters. The copending application, Serial Number 678,213, filed August 14, 1957, of T. L. Dimond, discloses a method of constraining the hand writing of alpha-numeric characters which enables these characters to be read by machines. In situations where the speed of writing is not a critical factor, the method of controlling the hand writing of alpha-numeric characters by forming the characters about a plurality of guide dots as disclosed in the T. L. Dimond application is a simple and accurate method of reducing hand writing to machine language. Where, however, a relatively high speed of writing is required or where relatively small characters are required and reliability of recognition is critical, the hand writing of the character about guide dots requires a high degree of dexterity on the part of the writer.

The copending application of the present inventor, Serial Number 806,255, filed April 14, 1959, discloses an improvement over the method and system of the Dimond application. Unlike the method of constraint imposed upon the writer in the Dimond application where alpha-numeric characters are written about guide dots, in the said improved scheme the writer forms the characters in a natural manner with respect to four parallel lines. The characters are written so as to intersect the two central parallel guide lines, with the space between the first and the second guide lines and the space between the third and fourth guide lines serving, respectively, as guides for the top and bottom of the characters. The four guide lines only control the overall height of the characters and hence the restriction or constraint imposed upon the writer is minimal. However, the most desirable arrangement would, of course, be that wherein no restraints whatever are necessary and the writer simply writes a row of characters in a natural manner.

It is accordingly a primary object of the present invention to substantially eliminate the constraint imposed upon the writer of handwritten alpha-numeric characters.

It is a further object of the invention to reduce the cost and complexity of systems for automatically reading printed or handwritten alpha-numeric characters.

Further objects of the invention are to increase the speed and improve the accuracy of the automatic machine reading of printed and handwritten alpha-numeric characters.

These and other objects are attained in accordance with the present invention wherein a flying polar scan is effectively centered in a rectangular matrix of points on the field of the characters. That is, the scan is centered sequentially in each of a plurality of vertical spots of a column and a row of numbers, or letters, is passed slowly under the scanner so that a plurality of such columns are scanned for each number. The row of characters moves in a direction perpendicular to the scan columns.

Character recognition is accomplished by a "feature extraction" method. That is, by determining line openings or, conversely, line closures (e.g., loops) in the character field and by determining the location of characterizing segments of lines in the character field, the essential features of the characters are extracted.

To this end, each polar scan comprises a plurality of line segments which extend radially from a center. The line segments of each polar scan may or may not cross a mark. Consequently, the reflection from a flying spot scanner beam as viewed by a photomultiplier can generate a pulse if a said line segment crosses a mark.

The sequence of information provided by the polar scans of each vertical column is integrated into a column or line descriptor. Hence, if forty scan centers per column are used, the sequence of states of forty polar scans is integrated into one line descriptor. A sequence of line descriptors is therefore generated as the field of each character passes the scanner. Some characters may have the same line descriptors, but the sequence of line descriptors is unique for each character. That is, each character can be distinguished from all others by its sequence of line descriptors. The successively derived line descriptors are matched sequentially with parallel sets of allowable and forbidden codes representing each of the possible characters. Thus, a character is recognized when all of its allowable codes and none of its forbidden codes match in order the sequence of line descriptors generated by the scanner.

Other objects and many of the attendant advantages of the invention will be readily appreciated as the same becomes better understood by reference to the following detailed description when considered in connection with the accompanying drawings in which:

FIG. 1 illustrates a typical row of characters which can be machine read in accordance with the present invention;

FIG. 2 is an enlarged pictorial representation of a typical flying polar scan pattern utilized to recognize alpha-numeric characters in accordance with the present invention;

FIG. 2A is a pictorial representation of a rectangular matrix of polar scan patterns superimposed on the field of a character, several illustrative scan patterns being shown at arbitrarily chosen positions;

FIG. 3 is an over-all block and pictorial diagram of the character recognition system of the present invention;

Figure 4:
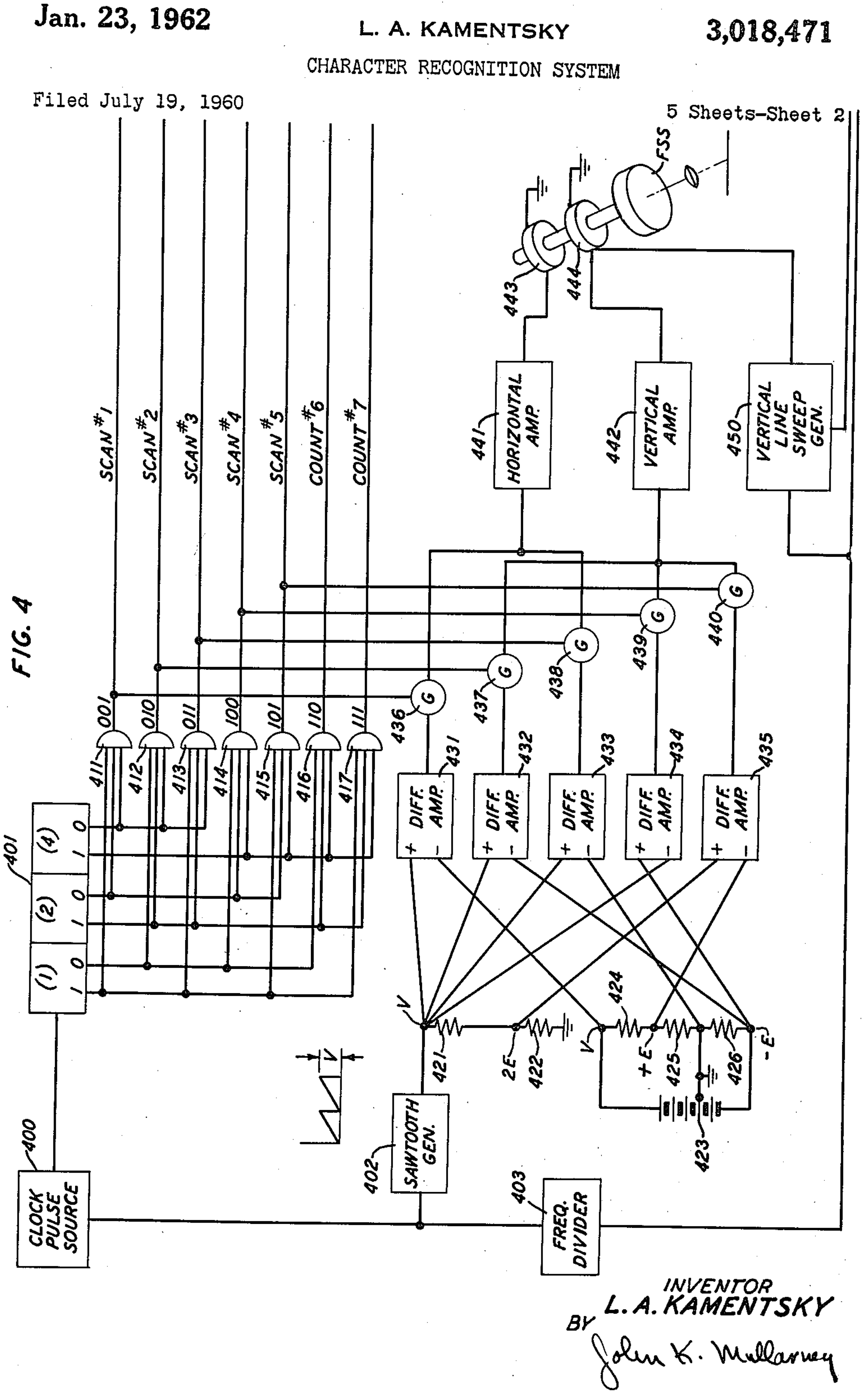

FIGS. 4 through 7, when arranged as shown in FIG. 8, show a detailed block diagram schematic of one illustrative embodiment of the character recognition system of the invention; and FIG. 9 is a diagram useful in the explanation of the present invention.

Turning now to the drawings, FIG. 1 shows a typical row of handwritten Arabic numerals capable of being read by a recognition system constructed in accordance with the present invention. As illustrated in the figure, the numerals are formed in a natural manner without reference to guide dots, guide lines and the like and numerous variations (e.g., in height, slant, form, etc.) in the production of the characters are permissible.

The basic scan advantageously utilized in accordance with the present invention to recognize machine printed or handwritten alpha-numeric characters is similar to that disclosed in the above-cited copending application of T. L. Dimond. The identity of the particular characters is determined by noting the traversals of particular line or scan segments in the character field and by determining the location of the scan in the character field, as will be described. The basic scan pattern is shown in FIG. 2 where five line segments designated 1 through 5 are used for character recognition. It is to be understood that the number of line segments used in recognizing the characters in the specific embodiment described herein is illustrative only, as a fewer or greater number of line segments may in fact be advantageously utilized. It is further understood that the relative location or angular disposition of the line segments 1 through 5 shown in FIG. 2 is illustrative only and the angular disposition of the respective line segments may be varied as required.

While the lengths of the line segments are not critical, preferably the segments 2 and 4 are of the same length, as are the segments 1 and 3. The line segments 2 and 4 should be of a length at least equal to one-half the height of the tallest number that might be encountered. The line segments 1 and 3 can be somewhat shorter than this.

The scan pattern illustrated in FIG. 2 is generated by a flying spot scanner. As shown in FIG. 3, the light spot from a flying spot scanner designated FSS is focused by means of lens system LS on the paper or form on which appear the alpha-numeric characters to be automatically recognized. This paper or form as shown in FIG. 3 is placed on a carriage which is moved from right to left by a mechanism (not shown) into the field of flying spot scanner FSS. The light pattern from the flying spot scanner focused on the paper or form is directed to a photomultiplier PM, the output of which is fed to the logic circuitry of the present invention via an amplifier and threshold circuit.

The scan pattern shown in FIG. 2 is effectively centered in a rectangular matrix of points on the field of the characters, as illustrated in FIG. 2A and again by the matrix of dots in FIG. 3. That is, the scan pattern is centered sequentially in each of a plurality of vertical spots of a column and the row of characters on the paper is passed slowly under the scanner so that a plurality of such columns are described for each number. A typical arrangement might comprise forty scan centers per column with from twenty to fifty or more columns per number. The movement of the row of characters is, preferably, in a direction more or less perpendicular to the scan columns.

The flying spot scanner FSS scans each character in the character field as carriage CR moves the paper on which the characters appear and each character passes underneath the scanner pattern and exits from the pattern to the left. Each column is scanned by the scanner from top to bottom. The exact carriage feed speed for accurate character recognition will vary with the size of the characters to be recognized, the type font of the characters to be recognized, and the degree of accuracy required.

A detailed description of the flying spot scanner deflection control circuit, the integration circuitry utilized to recognize intersections of line segments in the character field, and the recognition logic circuitry will now be given with respect to FIGS. 4 through 7 of the drawings when arranged as shown in FIG. 8.

The deflection control circuitry of the flying spot scanner, the line intersection recognition circuitry, and the logic circuitry are synchronized by a clock pulse source 400, shown in FIG. 4. Clock pulse source 400 supplies a continuous train of clock pulses at a desired frequency and may advantageously be any type of clock pulse source known in the art. The clock pulses from the output of clock pulse source 400 are supplied to binary counter 401, to sawtooth generator 402, and to frequency divider 403.

Binary counter 401 may advantageously be any type of binary counter known in the art and, as shown, comprises three binary stages. Each of these three stages is designated with a designation in parentheses indicating the decimal equivalent of the binary stage. Each of the three stages of binary counter 401 is arranged in the manner known in the art to supply "two rail logic output signals." In other words, each stage of binary counter 401 has a (0) and a (1) output lead. These leads extend to form a translation circuit, as shown in FIG. 4. Because binary counter 401 comprises three binary stages, the counter is capable of counting from 0 to 7 and, accordingly, as clock pulses from clock pulse source 400 are applied to the input of binary counter 401, the counter will count, in standard binary fashion, the successive pulses applied thereto. For example, when the first clock pulse is applied to stage (1) of the binary counter 401, this stage will set to its "1" state and will apply a signal over its (1) output lead. When the second clock pulse from clock pulse source 400 is applied to binary counter 401, stage (1) will be set to its "0" state and stage (2) will be set to its "1" state in typical binary fashion. As succeeding pulses from clock pulse source 400 are applied to binary counter 401, the respective stages will operate in the manner well known in the art.

The two rail logic (0) and (1) output leads from the respective stages of binary counter 401 are connected in a translation circuit, in the manner shown in FIG. 4, to AND gates 411 through 417. The output of each of these AND gates supplies a timing signal which is utilized by the flying spot scanner deflection circuitry and the recognition circuitry, in the manner to be described hereinafter. The inputs of AND gate 411, for example, are connected respectively to the (0) output lead of stage (4), the (0) output leads of stage (2), and the (1) output lead of stage (1) of binary counter 401. Thus, when the respective stages in binary counter 401 are set such that stage (1) is in its "1" state and stages (2) and (4) are in the "0" state, AND gate 411 will be actuated to apply a signal to the output lead labeled "SCAN #1." The signal will remain on this output lead until the next succeeding clock pulse from source 400 resets the binary counter 401. The remaining AND gates 412 through 417 are connected to the respective (0) and (1) output leads of the various stages of counter 401 in a similar fashion so as to provide output signals which correspond to the count in the binary counter. For example, an output signal appears on the lead labeled "SCAN #2" when the second clock pulse is applied to counter 401. This latter signal is terminated by the application of the third clock pulse to counter 401, and concurrently therewith an output signal appears on the lead labeled "SCAN #3"; and so on. As will be obvious to those in the art, the eighth clock pulse resets the counter to its initial condition and the above-described cycle of operation is thereafter repeated.

Turning now to a consideration of the flying spot scanner deflection control circuitry, the sawtooth generator 402 is triggered in response to each clock pulse to generate a sawtooth voltage of maximum amplitude V, as shown symbolically above generator 402. This sawtooth voltage is applied to a voltage divider comprising resistors 421 and 422. The relative values of these resistors are such that the sawtooth voltage appearing at the junction thereof sweeps from zero potential to a maximum amplitude of 2E.

A direct current voltage source 423 is connected across a second voltage divider consisting of resistors 424, 425, and 426. The values of the resistors of this voltage divider are chosen such that the potential at various points in the voltage divider are respectively V, +E, ground or zero, and −E, as shown in the drawing.

Five difference amplifiers 431 through 435 are used to generate the proper combinations of sawtooth and direct current voltage signals necessary to produce the scan pattern shown in FIG. 2. The difference amplifiers may advantageously be of any type known in the art and each serves to algebraically add the voltages applied to the input positive and negative terminals thereof.

The outputs of the difference amplifiers 431 through 435 are gated in proper sequence to the respective inputs of standard horizontal and vertical deflection amplifiers 441 and 442. The outputs of difference amplifiers 431 and 433 are applied to the horizontal deflection amplifier 441 via the gates 436 and 438, respectively, and the outputs of difference amplifiers 432, 434, and 435 are applied to the vertical deflection amplifier 442 via gates 437, 439, and 440, respectively. Gates 436 through 440 are connected respectively to the output leads of AND gates 411 through 415. The outputs of the horizontal and vertical deflection amplifiers are applied respectively to the horizontal and vertical deflection coils 443 and 444 of the flying spot scanner FSS.

A few examples should suffice to explain the operation of the deflection control circuitry. The first clock pulse of any scan cycle is applied simultaneously to the binary counter 401 and to the sawtooth generator 402. The generator 402 develops in response thereto a sawtooth voltage which increases in magnitude from zero to maximum amplitude V. The positive input terminal of difference amplifier 431 is connected to the terminal labeled V of the voltage divider coupled to the sawtooth generator 402. Hence, the sawtooth voltage described above is applied directly to said positive input terminal. The negative input terminal of the difference amplifier 431 is connected to the point of V potential on the second or direct current voltage divider. These signals are added algebraically in difference amplifier 431 and hence an output that sweeps from −V to zero volts is provided. Note, that when the sweep voltage from generator 402 reaches a maximum, the voltages applied to the positive and negative input terminals of amplifier 431 are equal and thus there is zero output voltage from amplifier 431.

Since an energizing signal is present on the lead labeled "SCAN #1," the output of difference amplifier 431 is applied via the energized gate 436 to the horizontal deflection amplifier 441. Accordingly, a horizontal sawtooth sweep voltage (from −V to zero volts) is applied to the horizontal deflection coil to generate the scan segment 1 shown in FIG. 2. The gates 437, 439, and 440 remain deenergized and therefore no voltage is applied to the vertical deflection amplifier 442.

The second clock pluse serves to set the counter 401 to the next count and to initiate a second sawtooth voltage signal in generator 402. The positive input terminal of difference amplifier 432 is also connected to the terminal labeled V of the voltage divider connected to sawtooth generator 402. Hence, a sawtooth voltage which increases in magnitude from zero to a maximum amplitude V is applied to this terminal. The negative input terminal of amplifier 432 is connected to the point of −E potential on the second or direct current voltage divider. Because the −E voltage is connected to the negative input terminal of amplifier 432, it is inverted in polarity and thus an output voltage that sweeps from +E to +E+V is provided. The gate 437 is energized by the signal appearing on the output lead of AND gate 412 and the aforementioned output sweep voltage is therefore applied to the vertical deflection amplifier 442. The gates 436 and 438 to 440 remain deenergized. The resultant sawtooth sweep signal when applied to the vertical deflection coil generates the scan segment 2 shown in FIG. 2.

The positive input terminal of the difference amplifier 435 is connected to the point designated 2E in the voltage divider connected to sawtooth generator 402. Hence the input to the positive terminal is a voltage that sweeps from zero or ground potential to a maximum voltage of 2E. The negative input terminal of amplifier 435 is connected to the point of +E potential in the direct current voltage divider. Accordingly, the output voltage from difference amplifier 435 sweeps from −E to +E volts. The fifth clock pulse initiates this latter sweep and further serves to energize AND gate 415 and hence gate 440 with the result that the scan segment 5, shown in FIG. 2, is generated.

The clock pulses from clock pulse source 400 are further applied to a conventional frequency divider 403. This divider has a division ratio of three hundred and twenty (320); that is, for every 320 input clock pulses a single output pulse is derived. This output pulse is applied to the vertical line sweep generator 450 which in response thereto generates a sawtooth voltage of long time duration (i.e., substantially equal to the count time of 320 clock pulses). This latter sawtooth voltage is applied to the vertical deflection coil for the purpose of shifting successively generated scan patterns, such as shown in FIG. 2, through a plurality of successive vertical spots. Since a complete scan cycle is generated for every eight clock pulses and the aforementioned division ratio is three hundred and twenty, forty scan patterns are generated per vertical sweep or column.

Figure 5:
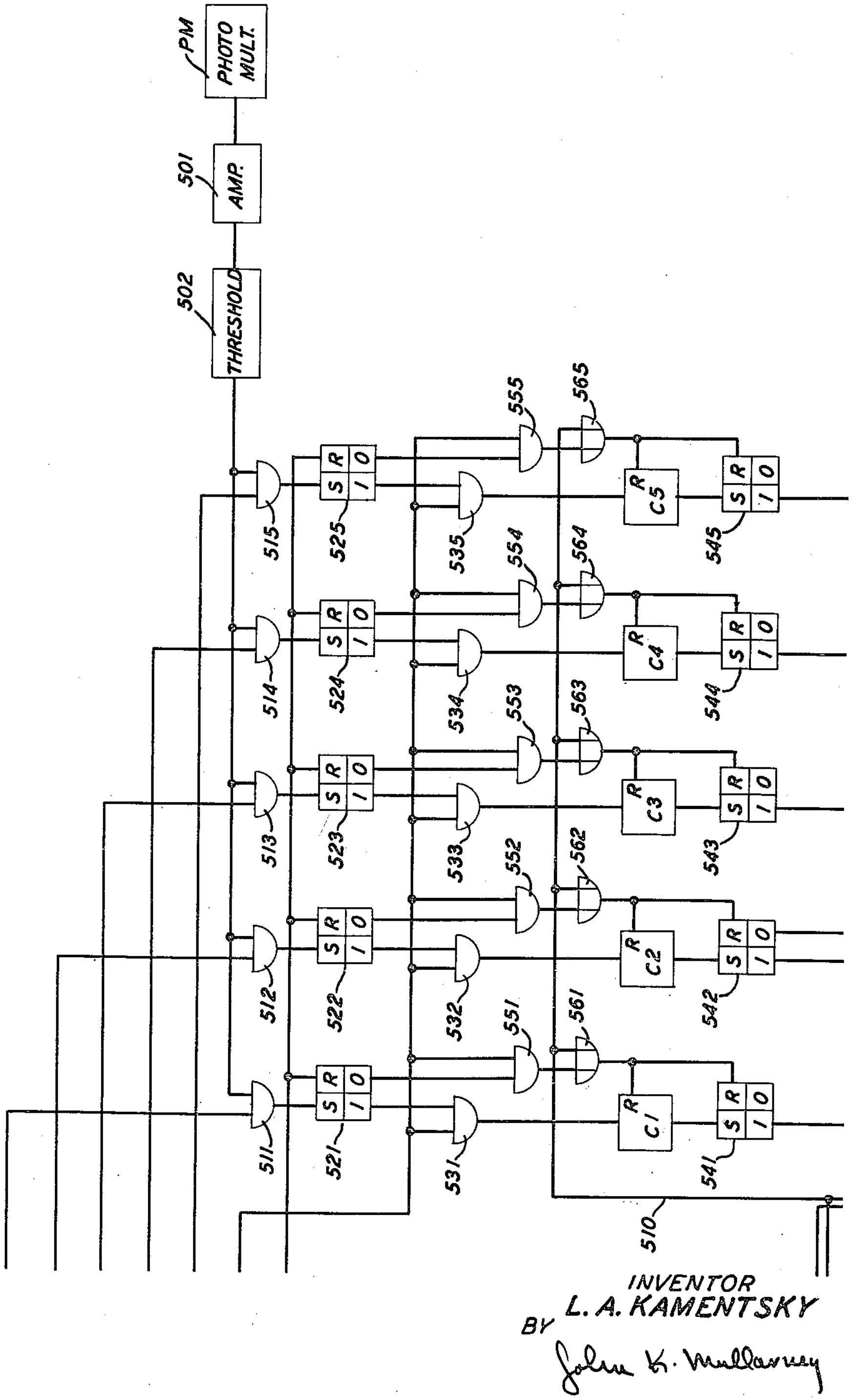

As described above, the flying spot scanner is controlled to make five scan or line segments for each scan pattern, and the light reflections from these line segments are gated to the logic circuitry to define characterizing line features. The manner in which the light reflections from flying spot scanner FSS are picked up, and the manner in which these reflections are integrated and operated upon, will now be described with reference to FIGS. 5, 6, and 7 of the drawings. As described hereinbefore, the light reflections from the character field are directed to the photomultiplier PM. The photomultiplier sees a continuous light reflection throughout each scan or line segment. If this scan is intersected by a line or a spurious mark, the light intensity reflected to photomultiplier PM will be reduced as the line or spurious mark is intersected. The output of the photomultiplier shown in FIG. 5 is then a voltage which has a specific direct current level until a mark is encountered. As the scan passes over the mark, the output of photomultiplier PM will then be a pulse with a negative direction. The duration of this pulse corresponds to the width of the line or mark intersected. Accordingly, for each scan there is a specific pattern of voltage on the output of the photomultiplier. If a scan does not intersect a mark, there will be a constant direct current level. However, when a scan intersects a line or a mark, there will be a negative pulse from the output of the photomultiplier for this scan. The output of the photomultiplier is applied to amplifier 501, which may advantageously be any type of amplifier known in the art, to amplify the voltage pulse received from the output of photomultiplier PM. The output of amplifier 501 is applied to threshold circuit 502 which determines whether there is indeed a pulse signal. In other words, threshhold circuit 502 will distinguish, at some predetermined threshold, weak pulses caused by reflections from dirt specks or smudges from strong pulses indicating the intersection of a true line or mark. Threshold circuit 502 also advantageously contains pulse shaping circuits known in the art which will shape the poorly defined pulses obtained from the output of amplifier 501 into sharply defined pulses.

As shown in FIG. 5, the output of threshold circuit 502 is applied respectively to the input of AND gates 511 through 515. The leads designated "SCAN #1" through "SCAN #5" are connected to the inputs of AND gates 511 through 515, respectively. The outputs of AND gates 511 through 515 are, in turn, connected to the inputs of flip-flops 521 through 525, respectively. Accordingly, if a line or mark is intersected during any one or all of the scan segments 1 through 5, one or more of the flip-flops will be set to the "1" state. For example, if a line is intersected during the third scan or line segment, the AND gate 513 will deliver a signal to set flip-flop 523 to its "1" state. If a line or mark does not occur during a particular scan segment, no actuating signal is delivered to the related flip-flop.

After all five scan or line segments have been completed, the information in the rank of flip-flops 521 through 525 is transferred to the binary counters C1 through C5 and the flip-flops 521 through 525 are then reset. To this end, the (1) output leads of flip-flops 521 through 525 are respectively coupled to the input of binary counters C1 through C5 via respective AND gates 531 through 535. The lead designated "COUNT #6" is also connected to each of the AND gates 531 through 535. Hence, when a signal appears on the "COUNT #6" lead in response to the sixth clock pulse, one or more of the counters C1 through C5 will receive an actuating signal if one or more of the flip-flops 521 through 525 are set to the "1" state. With the flip-flop information thus transferred to the counters, the flip-flops 521 through 525 will be reset by the signal which appears on the "COUNT #7" lead. As mentioned heretofore, the eighth clock pulse from source 400 resets the counter 401 to its original state and a new polar scan is thereafter repeated in the above-described fashion.

The flip-flops 521 through 525 act as one bit storage stages. That is, if any one of the flip-flops is set to its "1" state, a subsequent input "set" pulse applied thereto will have no effect thereon. The purpose of this is to eliminate the possibility of a counter registering two counts in the event that more than one mark or line is intersected during any given scan segment.

Should a flip-flop remain in its "0" state, the reset pulse signal from the "COUNT #7" lead is ineffectual with respect thereto.

The binary counters C1 through C5, which advantageously may be of any type well known in the art, are connected at their outputs to respective flip-flops 541 through 545, the latter serving as one bit storage stages of the type heretofore described. The counters C1 through C4 are designed to produce an output upon counting to four. The counter C5 is different and it produces an output upon reaching the count of two, as will be described hereinafter. Thus, for example, if the flip-flop 522 is set to its "1" state on four successive polar scans, the resultant four count in binary counter C2 will set flip-flop 542 to its "1" state.

The (0) output lead of flip-flops 521 through 525 are connected to the reset terminals of counters C1 through C5, respectively, and to the reset terminals of flip-flops 541 through 545, respectively, via the AND gates 551 through 555 and OR gates 561 through 565, respectively. The lead designated "COUNT #6" is connected to each of the AND gates 550 through 555. Hence, if after any particular polar scan the flip-flop 522, for example, remains in its "0" state, a reset signal will be delivered to the counter C2 and flip-flop 542 to reset the same. As described, to set any one of the flip-flops 541 through 544 to its "1" state the related binary counter must register a count on at least four successive polar scans. If, however, the counter C2 has counted to three and on the fourth polar scan the flip-flop 522 remains in its "0" state, a reset pulse signal will be delivered to the counter C2 to reset the same. The counter C2 must then begin the count all over.

As the polar scan center is moved successively from the top to the bottom of a vertical column, as described heretofore, the states of the flip-flops 541 through 545 change. These states describe the various loop configurations encountered and thus provide the means for identifying the character being scanned. For example, in FIG. 9 a single vertical column 91 of scan centers is shown superimposed on the Arabic numeral "2." Those polar scans having their centers at and adjacent to point 92 see a loop open to the left, while the polar scans at and adjacent to point 93 see a loop open to the right. Thus, a "2" can be described as a loop open to the left above a loop open to the right.

As the polar scan, such as shown in FIG. 2, is moved successively from the top to the bottom of the column 91 a point will be reached, more or less near the point 92, at which the flip-flops 542, 543, and 544 are set to their "1" state. The flip-flop 541 will remain in its "0" state since the scan or line segment 1 of the polar scan intersects no line or mark. At or near the point 93 the flip-flops 541, 542, and 544 are set to their "1" state, the flip-flop 543 having been reset to its "0" state since the line segment 3 no longer intersects a line. Thus, the successive states of these flip-flops describe the loop configurations encountered in one vertical sweep or column, i.e., they constitute one line descriptor.

The integration, by the counters C1 through C5, of redundant information serves to increase reliability. For example, if a spurious mark or dirt on the paper is encountered and is intersected by the scan segment 1 only one or two times, there will be no output from binary counter C1. Further, the said integration accomplishes what is in effect a searching for line openings or, conversely, line closures. This aids in distinguishing numbers that are poorly formed. For example, the numeral "3" is sometimes written in a manner such that it approaches in appearance the numeral "8." The integration of the information from a plurality of vertically disposed polar scans increases the recognition rate in such instances. It is to be understood that the degree of integration (i.e., the counts established for counters C1 through C5) is purely arbitrary and may advantageously be changed to meet any particular requirement.

The output pulse from the frequency divider 403 is applied, via the lead 510 and the OR gates 561 through 565, to the reset terminals of counters C1 through C5 and flip-flops 541 through 545. Thus, the counters and flip-flops are reset at the beginning of each vertical sweep or column.

Figure 6:
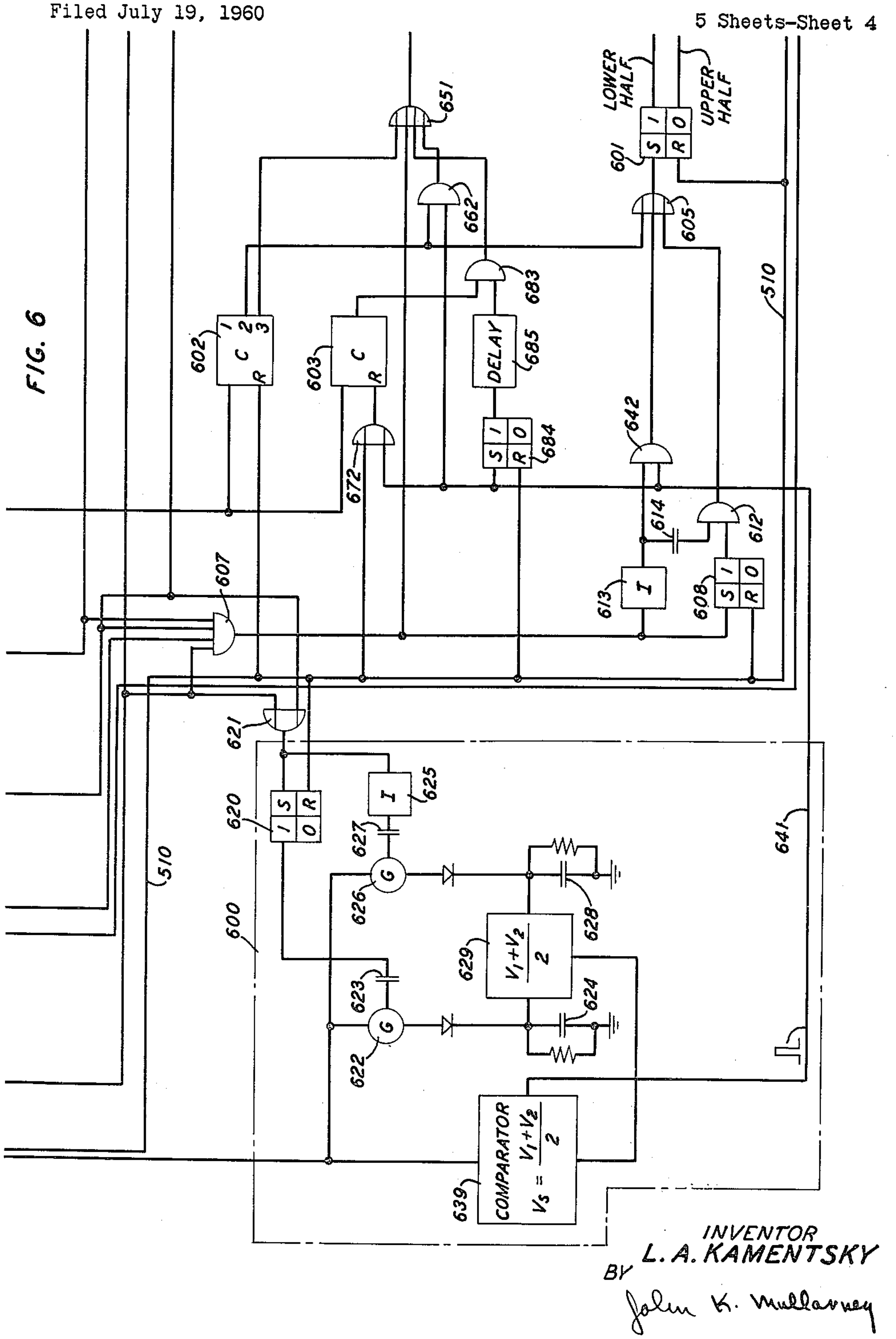
Figure 7:
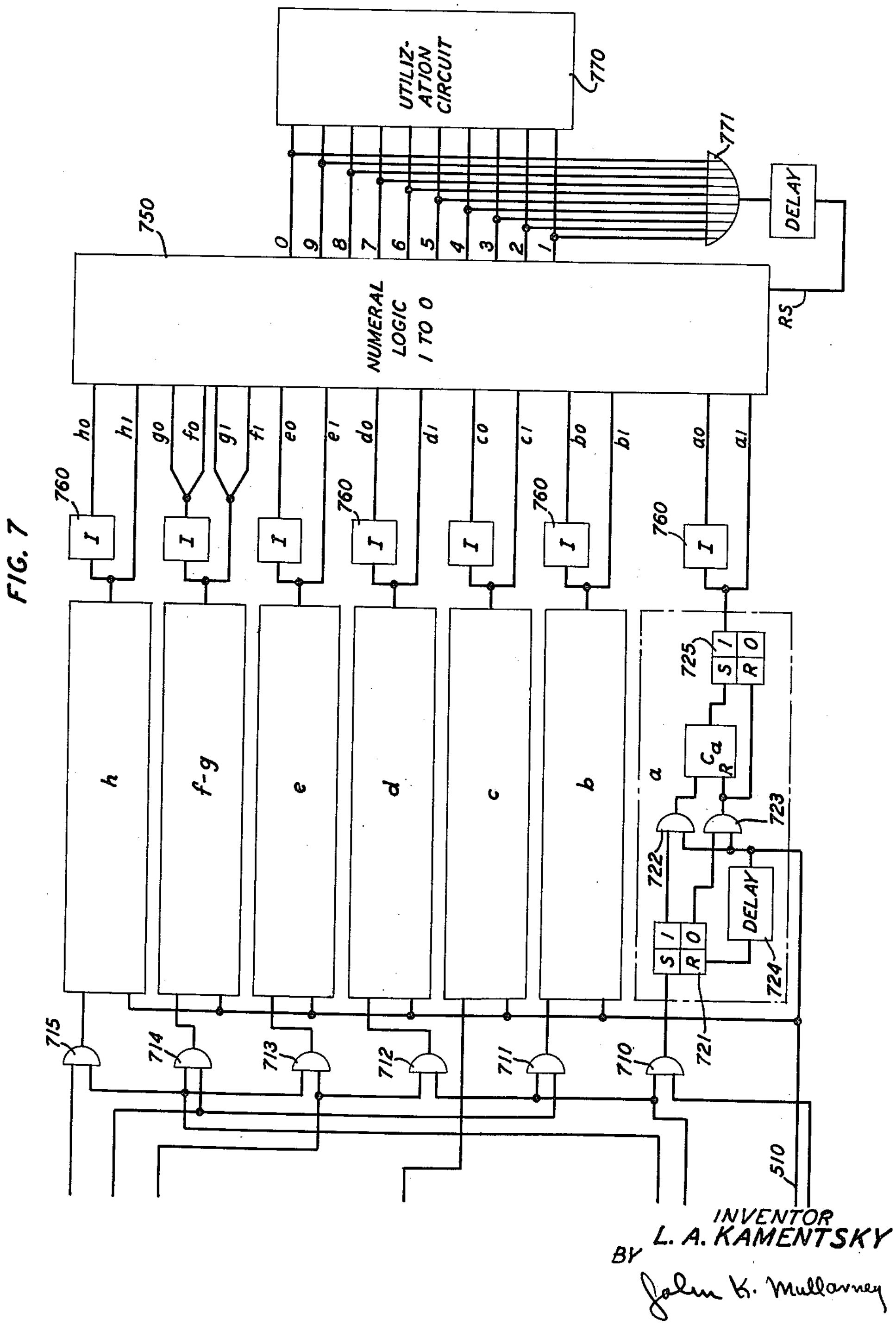

A relatively simple yet effective manner of translating the line descriptor information of flip-flops 541 through 545 into numeral recognition signals is illustrated in FIGS. 6 and 7 of the drawings. As a first step in this logic process, the line segment intersect information provided by the flip-flops 541 through 544 is transferred to the counters designated *a, b, d, e, f—g,* and *h* of the bank of counters *a* through *h* of FIG. 7. As will be described in greater detail hereinafter, this transfer of the flip-flop information is accomplished in a manner such that the above-enumerated designated counters will not only indicate the intersections of respective line segments with marks on the paper, as per flip-flops 541–544, but further will indicate whether these intersections have occurred during the upper or lower half of each vertical scan or sweep of a character. For example, if the flip-flop 543 is set to its "1" state during a given vertical scan or sweep of a character, the information provided thereby will be transferred to one or the other of the counters *d* or *e*, dependent upon whether the intersections of the scan segment 3 with a line or mark occurred during the upper or lower half of said vertical sweep. Hence, in this fashion, and as will be described in detail hereinafter, the intersections that occur, between the line segments 1, 2, and 3 and the character lines or marks, during the upper half of any given vertical sweep of a character will be registered or stored in the counters *a, b,* and *d.* In like manner, the intersections that occur, between the line segments 1, 3, and 4 and the lines or marks on the paper, during the lower half of any given vertical sweep will be registered or stored in the counters *e, f—g,* and *h.* Thus, the features or loops that are evident during the upper and lower halves of the vertical sweeps or scans of a character are extracted. These features are then used to achieve character recognition in the same manner as that disclosed in the above-noted copending application of the present inventor.

The scan segment 5, likewise, intersects character lines during given vertical sweeps of the polar scan pattern and this information is used to "set" the counter *c* for certain conditions, as will be described hereinafter.

The (1) output from the flip-flop 543 is coupled, as heretofer described, to the counters *d* and *e*, via the AND gates 712 and 713, respectively. The AND gate 712 is also connected to the (0) output lead of flip-flop 601, while AND gate 713 is connected to the (1) output lead of flip-flop 601. Accordingly, the state of this flip-flop will determine which of the counters *d* or *e* receives the pulse signal from flip-flop 543.

As stated above, the counters *a, b,* and *d* store information obtained during the upper halves of the vertical sweeps or scans of a character and the counters *e, f—g,* and *h* store information obtained during the lower halves of said vertical sweeps. The AND gates 710, 711, and 712 are connected at their inputs to the (0) output lead of flip-flop 601 and at their outputs to counters *a, b,* and *d*, respectively. The AND gates 713, 714, and 715 are connected at their inputs to the (1) output lead of flip-flop 601 and at their outputs to counters *e, f—g,* and *h*, respectively. Thus, line intersect information can be delivered to counters *a, b,* and *d* only when flip-flop 601 is in its "0" state and such information can be delivered to counters *e, f—g,* and *h* only when flip-flop 601 is in its "1" state.

The flip-flop 601 is in its "0" state (i.e., an energizing signal appears on the output lead labeled "upper half") at the beginning of each vertical sweep of the polar scan pattern and it remains in this state throughout the sweep of the upper half of the character being read. The flip-flop 601 is set to its "1" state (i.e., an energizing signal appears on the output lead labeled "lower half") at the beginning of the sweep of the lower half of the character being read and it so remains until the end of said sweep.

Thus, for example, if a "3" is being read the flip-flop 601 will switch from its "0" state to its "1" state at the cusp joining the upper and lower loops. In a similar fashion, if a "2" is being read the flip-flop will be switched when the vertically swept scan pattern reaches the central portion thereof at which the upper loop open to the left is joined to the lower loop open to the right.

There are three conditions which determine when flip-flop 601 will be switched from its "0" state to its "1" state, viz: (1) when the scan segment 5 of the polar scan pattern crosses the second line or mark of the character being read; (2) when a U type loop, such as encountered with an open numeral "4", has occurred and ended; and (3) when the scan pattern has scanned one-half the length (i.e., height) of the character being read and there is no U configuration. The flip-flop 601 is switched in response to any one of these conditions. The first condition performs the necessary switching of the flip-flop when numerals such as "2," "3," and "5" are being read. The second condition is unique to the numeral "4." The third condition prevails and will perform the necessary switching of flip-flop 601 for the reading of numerals such as "1" and "0."

To explain the first of the above-noted conditions, assume the numeral "2" is positioned under the scanner and a vertical sweep of the scan pattern such as shown at 91 in FIG. 9 has just commenced. The scan segment 5 is of a length somewhat greater than the distance between successive points of the vertical sweep and thus the horizontal or near horizontal lines of the numeral are intersected by the line segment 5 on at least two successive polar scan patterns. When the vertically stepped scan pattern reaches the uppermost portion of the numeral "2," the counter C5 will count to two and thence deliver a pulse signal to the flip-flop 545 to set the same to its "1" state. The (1) output of flip-flop 545 is connected to the input of counter 602. At the next successively lower positions in the vertical column the line segment 5 will not intersect a line or mark and therefore the counter C5 and flip-flop 545 will be reset. Toward the middle of the vertical column 91, of FIG. 9, the line segment 5 will again cross a portion of the numeral "2" on at least two successive polar scans and the flip-flop 545 will again be set to its "1" state. A second pulse signal is then delivered to counter 602. On counting to two the counter 602 delivers a pulse signal to the flip-flop 601 via the OR gate 605. Thus, the first of the above-enumerated conditions has been met (i.e., the scan segment 5 crosses the second line of a numeral) and the flip-flop 601 is set to its "1" state.

In general, two character lines are not crossed in the above-described fashion when reading the numeral "4." Hence the necessity for the second of the three conditions set forth above. During the upper half of any given vertical sweep of the numeral "4" the flip-flops 541, 543, and 544 will be set to their "1" state, while flip-flop 542 remains in its "0" state. The numeral "4" is a loop open to the top and therefore line segment 2 does not intersect a mark. The AND gate 607 is connected to the (1) output leads of flip-flops 541, 543, and 544 and to the (0) output lead of flip-flop 542. Accordingly, for the above-described states of the flip-flops 541 through 544, an energizing signal will be passed by the AND gate 607 to the flip-flop 608 to set the same to its "1" state. The (1) output lead of flip-flop 608 is connected to the AND gate 612. When the polar scan pattern is stepped past the more or less horizontal line of the numeral "4," the line segments 1 and 4 no longer intersect a mark and the output signal from the AND gate 607 is thus terminated. In response to this termination the inverter 613 applies a short pulse signal to the AND gate 612 via the capacitor 614. The flip-flop 608 remains in its "1" state until reset and hence a pulse signal is delivered by the AND gate 612 to the flip-flop 601 via OR gate 605. In effect then, the flip-flop 601 is set to its "1" state when a U type loop has occurred and ended.

For numerals such as "1" or "0" the scan segment 5 will not cross two lines or marks as heretofore described. It is therefore necessary that the flip-flop 601 be set to its "1" state after half the vertical height of the numeral being read is traversed. However, for the numeral "4" the flip-flop 601 should be set to its "1" state only after a U type configuration has occurred and ended. Hence, the third of the above-enumerated three conditions, viz, no U configuration has occurred but the scan pattern has scanned one-half the length (i.e., height) of the numeral being read. This condition is met in part by the center line determination circuit 600 of FIG. 6. What the center line determination circuit does is to produce an output pulse after the vertical sweep traverses approximately one-half the height of the numeral being read.

The flip-flop 620 of the center line determination circuit is connected to the (1) output leads of flip-flops 541 and 543 via the OR gate 621. Hence, the flip-flop 620 is set to its "1" state when the top or uppermost portion of a character is intersected by either line segment 1 or 3 of the polar scan pattern. Flip-flop 620 acts as a one bit storage stage, as heretofore described. The (1) output lead of flip-flop 620 is connected to gate 622 via capacitor 623. This provides a short energizing pulse to operate the normally blocked gate 622. The gate 622 is also connected to the vertical line sweep generator 450 and hence when energized the gate delivers to the capacitor 624 a voltage $V_1$ which is equal to the voltage of the sawtooth voltage output of generator 450 at the time that a mark or line is encountered by either of the line segments 1 or 3. A very high resistance shunts the capacitor 624 and the capacitor 624 therefore retains its charge over an extended period.

When the polar scan pattern is stepped to the bottom or lowermost portion of the character being read, the line segments 1 and 3 will sooner or later fail to intersect a line or mark. This then is indicative of the lowermost portion of the character. At this point the flip-flops 541 and 543 are reset, in the aforementioned manner, and the inverter 625, which is also connected to the (1) output leads of these flip-flops via OR gate 621, will initiate a pulse type signal in response thereto. The pulse from the inverter is fed to gate 626, via capacitor 627, to momentarily energize the same. The gate 626 is also connected to the vertical line sweep generator 450 and hence when energized this gate delivers to the capacitor 628 a voltage $V_2$ which is equal to the voltage of the sawtooth voltage output of generator 450 at the time that a line is no longer encountered by either of the line segments 1 or 3. A very high resistance, likewise, shunts the capacitor 628.

The voltage $V_1$ is indicative of the uppermost portion of a character being read and the voltage $V_2$ is indicative of the lowermost portion of a character being read. By simple trigonometric principles we know that when these voltages are added and their sum divided by two, a voltage will be obtained which is indicative of the center portion of the character being read. As indicated in FIG. 6, this function is performed in the block 629. The block 629 can comprise any conventional analog amplifier which performs addition and a voltage divider output to halve the voltage output of said amplifier. The voltages across the capacitors 624 and 628 are fed to the two input terminals of the analog amplifier and the output voltage, taken from a tap on the aforementioned voltage divider, is delivered to the voltage comparator 639. After the first or second vertical sweep of a character the capacitors 624 and 628 will be charged to their appropriate voltage $V_1$ and $V_2$, and appropriate values for $V_1$ and $V_2$ will be continuously determined throughout the scan of a character.

The voltage comparator 639 is also connected to the output of the vertical line sweep generator 450 for receiving therefrom the sawtooth voltage ($V_s$). The voltage comparator 639, which may advantageously be of any conventional type known in the art, compares the sawtooth voltage ($V_s$) to the voltage $$\left(\frac{V_1+V_2}{2}\right)$$

and it produces an output pulse signal when voltage ($V_s$) reaches a magnitude equal to $$\left(\frac{V_1+V_2}{2}\right)$$

that is, a pulse is produced when $$V_s=\frac{V_1+V_2}{2}$$

Thus, a pulse is produced by comparator 639 each time the vertically shifted polar scan pattern traverses approximately one-half the length or height of the character being read.

The output pulse signal from comparator 639 is delivered via lead 641 to the input of AND gate 642. The other input to the AND gate is from inverter 613, the latter being connected at its input to the U configuration AND gate 607, as heretofore described. Accordingly, an energizing signal is delivered from AND gate 642 to the flip-flop 601, via OR gate 605, when the center line determination circuit 600 produces a pulse output and there is no U configuration.

With the flip-flop 601 in its "0" state, the (1) output of flip-flop 541 is fed to counter *b* via AND gate 711, the (1) output of flip-flop 542 is fed to counter *a* via AND gate 710, and the (1) output of flip-flop 543 is fed to counter *d* via AND gate 712. When the flip-flop 601 is set to its "1" state, the (1) output of flip-flop 541 is fed to counter *f—g* via AND gate 714, the (1) output of flip-flop 543 is fed to counter *e* via AND gate 713, and the (1) output of flip-flop 544 is fed to counter *h* via AND gate 715.

The pulse output that appears on the lead 510, connected to the output of the frequency divider 403, is applied to the respective reset terminals of counter 602 and flip-flops 601, 608, and 620. Thus, the logic circuitry is reset at the start of each vertical sweep of the polar scan pattern.

To distinguish the numeral "8" from the numeral "0" and, as an ancillary purpose, to provide some redundancy for several of the other numerals such as "4" and "9," it is desirable to register a count in counter *c* if certain predetermined conditions or situations occur during any given vertical scan or sweep of a character. These conditions are as follows: (1) the occurrence of a U configuration indicative of the numeral "4"; (2) at least three line crossings, that is, the crossing of three more or less horizontal lines by line segment 5 during any given vertical sweep; and (3) two such crossings in the upper half of a vertical sweep or, alternatively, two crossings in the lower half of a vertical sweep.

Some of the above-described conditions make use of circuitry heretofore described. In these instances such circuitry will not again be described in detail. The AND gate 607 is connected to the flip-flops 541 through 544, as heretofore described, for the purpose of providing a pulse signal when a U configuration occurs. The output of AND gate 607 is connected to the input of counter *c* via the OR gate 651. Accordingly, a count is registered in counter *c* in response to the output signal from AND gate 607.

The counter 602 is connected to the (1) output lead of flip-flop 545. As heretofore described, the flip-flop 545 is set to its "1" state when the line segment 5 crosses a line or mark on two successive polar scans. The counter 602 registers a count each time flip-flop 545 is set to its "1" state. If the line segment 5 crosses three lines in any single vertical sweep of the scan pattern (such as can occur in the vertical sweep of the numeral "3" or "5"), the counter 602 will count to three and thence deliver an output pulse signal to the counter $c$ via the OR gate 651.

The counter 602 is also provided with a "two count" output lead. When the counter therefore counts to two, an output signal is delivered to the AND gate 662. This signal from counter 602 is applied to AND gate 662 until the counter 602 is reset by the "end of sweep" pulse signal on lead 510. The pulse signal from the center line determination circuit 600, described heretofore, is also applied to the input of AND gate 662. Hence, if two of the above-described character line crossings occur during the upper half of a sweep, the pulse signal from the center line determination circuit 600 is passed by the AND gate 662 and the OR gate 651 to the counter $c$.

The last situation or condition, namely, two line crossings on the lower half of a sweep, will now be described. The counter 603 is connected to the (1) output lead of flip-flop 545. This counter is designed to count to two in the same fashion as counter 602, heretofore described. The pulse signal from the center line determination circuit 600 is applied to the reset terminal of counter 603 via the OR gate 672. Thus, the counter 603 is reset each time the vertical scan or sweep traverses one-half the height of the character being read. Hence, only those line crossings that occur thereafter, that is, in the lower half of each vertical sweep, are effectively counted. If two line crossings are encountered in the lower half of such a sweep, an output pulse signal is delivered to AND gate 683.

The pulse from the center line determination circuit 600 is also fed to the input of flip-flop 684 to set the same to its "1" state. The (1) output of the flip-flop is applied to AND gate 683 via the delay 685. Since two line crossings might be encountered during the upper half of a vertical sweep, and the counter 603 accordingly set to provide an output signal to the AND gate 683, it is necessary that the counter 603 be reset prior to the application of the (1) output from flip-flop 684 to the AND gate 683. The delay 685 insures this sequence of events.

With the counter 603 in its reset condition and the delayed output of flip-flop 684 applied to AND gate 683, a pulse signal will be sent from counter 603 to the AND gate 683 should the counter 603 count to two. This pulse signal is thence passed by AND gate 683 and OR gate 651 to the counter $c$.

Summarizing the above, if any when one of the four above-enumerated conditions exists during a vertical sweep the counter $c$ will register a count.

The pulse from the frequency divider 403 is also delivered to the reset terminal of counter 603 via the OR gate 672 and to the reset terminal of flip-flop 684, for the purposes hereinbefore described.

The counters $a$ through $h$ are similar and therefore only counter $a$ will be described in detail. As explained heretofore, a pulse signal is delivered to counter $a$ via the AND gate 710 if and when the flip-flop 542 is set to its "1" state during the upper half of any vertical sweep of a character. The flip-flop 721 of counter $a$ is set to its "1" state in response to such an input pulse signal. The (1) output of flip-flop 721 is delivered to a conventional three stage binary counter $Ca$ via the AND gate 722, while the (0) output of said flip-flop is fed to the reset terminal of counter $Ca$ via AND gate 723. The frequency divider pulse that appears on lead 510, as heretofore described, is applied directly to the AND gates 722 and 723, and to the reset terminal of flip-flop 721 via a delay 724. The counter $Ca$ is designed to register a four count before an output pulse therefrom is delivered to the flip-flop 725. The recited "four count" is given only by way of example and it will be clear to those in the art that higher or lower counts in the counters $a$ through $h$ may be utilized to advantage. During any given vertical sweep of the polar scan pattern the flip-flop 721 may be set to its "1" state. The aforementioned frequency divider pulse is applied to the AND gate 722 prior to the next vertical sweep and this transfers the (1) output of flip-flop 721 to the counter $Ca$ via AND gate 722. The frequency divider pulse also resets flip-flop 721 but due to delay 724 this reset occurs only after the (1) output signal thereof has been delivered to the counter. If flip-flop 721 is set to its "1" state on at least four successive vertical sweeps, an output from the counter $Ca$ will be fed to the flip-flop 725 to set the same to its "1" state. Flip-flop 725 is of the one bit storage type heretofore described. If the flip-flop 721 is set to its "1" state on two or three successive vertical sweeps, but then remains in its "0" state on the very next vertical sweep, the (0) output signal from the flip-flop 721 will be gated through to the reset terminals of counter $Ca$ and flip-flop 725 when the frequency divider pulse appears on the lead 510.

From the foregoing it will thus be seen that the input flip-flops of counters $a$ through $h$ store, in parallel, the line descriptor information developed during any given vertical sweep. The three stage binary counters of counters $a$ through $h$ integrate the line descriptor information for several (e.g., four) successive vertical sweeps. This integration of redundant information increases reliability.

The output signals from counters $a$ through $h$ are applied directly to the numeral logic circuit 750 via leads $a1$ through $h1$, respectively. The leads $a0$ through $h0$ are connected to the output leads $a1$ through $h1$, respectively, via inverters 760. Thus, if no output signal appears on lead $a1$, for example, a signal will appear on lead $a0$. The signals, if any, on leads $a0$ through $h0$ are likewise applied to the numeral logic 750.

The logic codes required for recognition of each of the Arabic numerals "1" through "0" may advantageously be determined by scanning the polar scan pattern over each of the Arabic numerals in the manner heretofore described. As the numerals move from right to left with respect to the scanner, changes in the line segments intersected are noted. Thereby a list of line segments intersected for each possible position of each numeral as the numerals pass through the scan pattern will be obtained. These lists may then be logically processed to formulate a set of allowable and forbidden codes for each of the Arabic numerals. Such a list of allowable and forbidden codes for each of the numerals is given below in the table designated "Recognition Logic Table."

For purposes of determining the logic codes for each of the numerals, the upper and lower halves of each vertical sweep of the polar scan pattern are listed independently in the table. For a reason to be given hereinafter, the information provided by counter $c$ is listed with the information derived from counters $a$, $b$, and $d$. Referring to the table, a 0 under a counter column indicates that a mark or line was not registered in that particular counter, a 1 in a counter column indicates that a mark or line was registered in that particular column, and a dash in a column indicates a "don't care" condition, that is, it is not important whether a line or mark is intersected. As the characters move through the scan pattern, logic conditions are met in stages or steps in performing the translation. In the table these logic stages are indicated under the columns "Logic Stage." The XU stages represent the logic stages for the upper half of the vertical sweep of the polar scan pattern, and the XL stages represent the logic stages for the lower half of each vertical sweep. The respective stages are bracketed in the table. For example, the logic code for the upper half scan, of the vertically swept scan pattern, for recognizing the Arabic numeral "1" has a logic stage designated XU1 which is met when the conditions in the counters $a$, $b$, $c$, and $d$ are respectively 0, —, 0, and 1. The logic stages in the table which are bracketed with a prime symbol, as, for example, the XU2 stage for the Arabic numeral "1," are inhibiting stages representing forbidden codes in the logical recognition of the character.

*Recognition logic table*

| Numeral | Logic Stage | a b c d | Logic Stage | e f g h |
|---|---|---|---|---|
| 1 | XU1 | 0 — 0 1 | XL1 | 1 — — 0 |
| | XU2 | {1 — — — or — — 1 — and XU1=1}' | XL2 | {— — — 1 and XL1=1}' |
| | XU3 | {0 1 0 — and XU1=1 and XU2=0} | XL3 | {— 1 1 0 and XL1=1 and XL2=0} |
| 2 | XU1 | 0 — 0 — | XL1 | 1 — — 0 |
| | XU2 | {1 0 — 1 and XU1=1} | XL2 | {— 1 1 1 and XL1=1} |
| | XU3 | {0 — 0 — and XU2=1} | XL3 | {— — — 0 and XL2=1} |
| 3 | XU1 | 0 — 0 — | XL1 | — — — 0 |
| | XU2 | {1 — 0 1 and XU1=1} | XL2 | {1 0 0 1 and XL1=1} |
| | XU3 | {1 0 1 1 and XU2=1} | XL3 | {— 1 1 0 and XL2=1} |
| | XU4 | {0 1 0 — and XU3=1} | | |
| 4 | XU1 | 0 — 0 1 | XL1 | 1 0 0 0 |
| | XU2 | {0 1 1 1 and XU1=1} | XL2 | {— — — 1 and XL1=1}' |
| | XU3 | {XU1=1 or XU2=1 and 1 — — —}' | XL3 | {— 1 1 0 and XL1=1 and XL2=0} |
| | XU4 | {0 1 0 — and XU2=1 and XU3=0} | | |
| 5 | XU1 | 0 — 0 1 | XL1 | 1 0 0 1 |
| | XU2 | {1 1 1 0 and XU1=1} | XL2 | {— 1 1 0 and XL1=1} |
| | XU3 | {0 1 0 — and XU2=1} | | |
| 6 | XU1 | 0 — 0 1 | XL1 | 1 — — 0 |
| | XU2 | {1 — — 1 and XU1=1}' | XL2 | {1 0 0 1 and XL1=1 or 1 0 0 1 and XL1=1}' |
| | XU3 | {— 1 — 0 and XU1=1 and XU2=0} | XL3 | {1 1 1 1 and XL1=1} |
| | | | XL4 | {— 1 1 0 and XL2=0 and XL3=1} |
| 7 | XU1 | 1 0 — 1 | XL1 | 1 — — 0 |
| | XU2 | {— 1 1 — and XU1=1}' | XL2 | {— — — 1 and XL1=1}' |
| | XU3 | {0 1 0 — and XU1=1 and XU2=0} | XL3 | {— 1 1 1 and XL1=1 and XL2=0} |
| 8 | XU1 | 0 — — 1 | XL1 | 1 — — 0 |
| | XU2 | {1 1 1 1 and XU1=1} | XL2 | {1 1 1 1 and XL1=1} |
| | XU3 | {0 1 0 — and XU2=1} | XL3 | {— 1 1 0 and XL2=1} |
| 9 | XU1 | 0 — 0 1 | XL1 | 1 — — 0 |
| | XU2 | {1 1 1 1 and XU1=1} | XL2 | {1 0 0 0 and XL1=1} |
| | XU3 | {0 1 0 — and XU2=1} | XL3 | {— 1 1 0 and XL2=1} |
| 0 | XU1 | 0 — 0 1 | XL1 | 1 — — 0 |
| | XU2 | {— — 1 — and XU1=1}' | XL2 | {1 1 1 1 and XL1=1} |
| | XU3 | {1 1 0 1 and XU1=1} | XL3 | {— 1 1 0 and XL2=1} |
| | XU4 | {0 1 0 — and XU2=0 and XU3=1} | | |

Treating the upper and lower halves of each vertical sweep as independent, the development of the recognition logic conditions shown in the above table for the Arabic numeral "1" will be given. This should suffice to indicate the manner in which the logic conditions for the other numerals are developed. Looking first at only the upper half of a sweep, it will be observed that a mark will be registered in counter *d* as the Arabic numeral "1" moves into the scan pattern. As heretofore described, a count in counter *d* results from line segment 3 intersecting a line or mark. At the same time no marks will be detected by line segments 1, 2, and 5; hence there is no count registered in counters *a*, *b*, and *c*. However, at this stage of the scanning it is not known whether a mark will be detected by scan segment 1 because a portion of the previously detected character may still be present in the area scanned, and accordingly the counter *b*, associated with scan segment 1, is assigned a "don't care" condition in the table. Thus, as shown in the above table, the logic code condition required for the first logic stage XU1 for the recognition of Arabic numeral "1" is indicated by a 0, — or "don't care," 0, and 1.

As the Arabic numeral "1" passes through the scanner pattern, the previous set of line intersections will change to the following: no count will be registered in counters *a* and *c* because the line segment 2, associated with counter *a*, will not intersect a line and none of the four conditions recited previously for a count in *c* will occur. However, there will be a line intersected by the line segment 1 and hence a corresponding indication in counter *b*. At this point there will be a "don't care" condition for counter *d*. This logic code condition is shown in the above table as stage XU3 for the upper half of a vertical sweep. However, after the first stage XU1 is set and before the third stage XU3 is set, a further condition must be met. This condition is an inhibiting condition and comprises a forbidden code for the detection of the Arabic numeral "1." For example, if a horizontal line segment is intersected by line segment 2, associated with counter *a*, or counter *c* is set to deliver an output signal, indicating that the character being scanned is not a single vertical line as would be the case for the Arabic numeral "1," an inhibiting stage is actuated. The actuation or setting of this inhibit stage prevents the logic circuitry associated with the Arabic numeral "1" from indicating that the number being scanned is the numeral "1." Referring to the table, the inhibit stage is shown as logic stage XU2 and is set if counter *a* or counter *c* provides an output signal and the preceding stage XU1 is set.

In similar manner, when the Arabic numeral "1" is considered as being passed through the lower half of the vertical sweep, a mark will be detected first by line segment 3 which sets counter *e* to deliver an output signal. At the same time no mark will be detected by line segment 4 and hence there is no output from counter *h*. As shown in the above code table, the first logic stage for the lower half of the vertical sweep of numeral "1" is identified as XL1, and the logical condition is met when a signal appears on the *e*1 lead and a signal appears on the *h*0 lead indicating that no signal was delivered by counter *h*.

The next logic stage XL2 in the lower half of the vertical scan is an inhibiting stage. As shown in the code table given above, if, after stage XL1 is set, a signal output is provided by counter *h* indicating that the character being scanned contains a somewhat extended horizontal line and accordingly cannot be the Arabic numeral "1," the logic code conditions for the inhibit stage XL2 are met and this stage is set to inhibit the remainder of the logic circuitry for translating the character "1." Note, in order for the counter *h* to be set, the line segment 4 would have to intersect a character line on at least four successive vertical sweeps. Thus, even if the line segment 4 should intersect a part of the numeral "1" on one or two vertical sweeps, as a result of the numeral being somewhat slanted, a response from counter *h* is effectively prevented by the integration of at least four successive vertical sweeps.

Referring again to the "Recognition Logic Table," the third stage, that is, stage XL3, of logic for the lower half of the vertical sweep of the scan pattern is set when a line or mark is successively detected by line segment 1 and no mark is detected by segment 4. This results in counter *f*—*g* providing an output signal to leads *f*1 and *g*1, with no output signal to lead *h*1 from counter *h*. This occurs as the Arabic numeral "1" passes through the scan pattern and exits to the right. If these conditions are met and logic stage XL1 has been previously set, and inhibit stage XL2 has not been set, stage XL3 will be operated.

Given the above "Recognition Logic Table," it is within the skill of one in the art to provide the necessary numeral logic circuitry for achieving numeral recognition. In this regard it should be noted that the above "Recognition Logic Table" is similar in all essential details to the "Recognition Logic Table" disclosed in the copending application of the present inventor. Accordingly, the numeral logic disclosed in FIGS. 10 to 15 of said copending application can be utilized herein for numeral recognition. To facilitate a comparison of tables, the counter *c* column was listed herein adjacent counter columns *a*, *b*, and *d*.

As shown in FIG. 7, the output leads from the numeral logic circuitry 750 are applied to utilization circuit 770. This utilization circuit may be any type of circuit known in the art which in response to the machine language appearing on one of the leads 0 through 9 performs an operation such as punching a card or recording the information on a magnetic tape. When a signal is applied to any of the output leads to indicate the recognition of a character, OR gate 771 is also actuated. The output of OR gate 771 is delayed for a predetermined interval before being applied to the reset lead RS. This reset is applied to all of the necessary components of the numeral logic circuitry to reset the same. Thus, as soon as a character is recognized, the numeral logic is reset in preparation for recognition of the next character to be scanned.

What has been described hereinbefore is a specific illustrative embodiment of the principles of the present invention. It is to be understood that numerous other arrangements of physical parts and different component parts may be utilized with equal advantage. For example, it will be readily appreciated that the electron beam of flying spot scanner FSS may be electrostatically controlled rather than magnetically controlled as described above. Furthermore, it is to be understood that the exact number of scan or line segments and their relative angular disposition may be advantageously adjusted to meet a specific character recognition problem. It is also to be understood that the amount of integration provided by binary counters C1 through C5 and C*a* through C*h* may advantageously be adjusted to meet more specific requirements. In addition, the feed rate at which the carriage CR moves the characters to be recognized through the scanner pattern may advantageously be adjusted to meet specific character recognition speeds.

While only the reading of Arabic numerals has been discussed, it will be clear to those in the art that the principles of the present invention may be readily extended to read alphabetical letters as well as Arabic numerals.

Accordingly, it is to be understood that the above-described arrangement is illustrative of the application of the principles of the present invention and numerous modifications thereof may be devised by those skilled in the art without departing from the spirit and scope of the invention.

What is claimed is:

1. A character recognition system comprising scanning means for scanning a field which includes a character to be recognized, means for controlling said scanning means to scan repeatedly in a polar scan pattern comprising a plurality of radial scan line segments extending from a center, means for successively moving said center sequentially in each of a plurality of vertical spots of a column, means for scanning a plurality of such vertical columns for each character to be recognized, sensing means operative to provide an output signal when a portion of said character is intersected by any of said scan line segments, and means responsive to the output signals from said sensing means to provide a manifestation indicative of the identity of the character scanned.

2. A character recognition system as defined in claim 1 wherein a row of characters to be recognized is moved in a direction perpendicular to said vertical columns.

3. In a character recognition system the combination comprising scanning means for scanning a field which includes a character to be recognized, means for controlling said scanning means to scan repeatedly in a polar scan pattern comprising a plurality of radial scan line segments extending from a center, means for moving said center sequentially in each of a plurality of vertical spots of a column, and means for scanning a plurality of vertical columns for each character to be recognized.

4. A character recognition system comprising scanning means for scanning a field which includes a row of characters to be recognized, means for controlling said scanning means to scan repeatedly in a polar scan pattern comprising a plurality of radial scan line segments extending from a center, means for moving said center sequentially in each of a plurality of vertical spots of a column, means for generating a plurality of said vertical columns for each character to be recognized, sensing means operative to provide an output signal when a portion of said character is sensed by any of said scan line segments, means responsive to the output signals from said sensing means to provide manifestations descriptive of the character features sensed during each of said vertical columns, and means responsive to successively generated descriptive manifestations to provide an indication of the identity of the character scanned.

5. In combination, scanning means for scanning a field which includes a character to be recognized, means for controlling said scanning means to scan repeatedly in a polar scan pattern comprising a plurality of radial scan line segments extending from a center, means for moving said scan center sequentially in each of a plurality of vertical spots of a column, means for scanning a plurality of such vertical columns for each character to be recognized, pick-up means operative during each scan line segment to provide a signal pulse in response to the traversal by said scanning means of a mark on said field, a plurality of counter means coupled to said pick-up means and individually associated with each of said scan line segments, each of said counter means being operative to provide an output signal when a portion of said character is traversed by the scan line segment associated therewith for a predetermined number of successive repetitions of said polar scan pattern, and means responsive to the output signals from said plurality of counter means to provide an indication of the identity of the character scanned.

6. A character recognition system comprising scanning means for scanning a field which includes a row of characters to be recognized, means for controlling said scanning means to scan repeatedly in a polar scan pattern comprising a plurality of radial scan line segments extending from a center, means for moving said center sequentially in each of a plurality of vertical spots of a column, means for generating a plurality of said vertical columns for each character to be recognized, sensing means operative to provide an output signal when a portion of said character is sensed by any of said scan line segments, a plurality of counter means coupled to said sensing means and individually associated with each of said scan line segments, each of said counter means being operative to provide an output signal when a portion of said character is sensed by the scan line segment associated therewith on a predetermined number of successive polar scan patterns of any vertical column, means operative in response to the output signals from said counter means to provide manifestations indicative of the character loop configurations that are encountered during the movement of said polar scan pattern throughout a vertical column, means for integrating those manifestations that occur for a predetermined number of vertical columns, and means responsive to the output signals from said integrating means to provide an indication of the identity of the character scanned.

7. A character recognition system as defined in claim 6 wherein the polar scan pattern comprises four radial scan line segments disposed in space quadrature.

8. A character recognition system as defined in claim 7 wherein the successively generated vertical columns are parallel to two aligned scan line segments, and the row of characters to be recognized is moved in a direction substantially perpendicular to said aligned scan segments and said vertical columns.

9. In a character recognition system the combination comprising scanning means for scanning a field which includes a character to be recognized, means for controlling said scanning means to scan repeatedly in a polar scan pattern comprising a plurality of radial scan line segments emanating from a center, means for sequentially moving said center in a rectangular matrix of points on the field of a character, sensing means operative to provide an output signal when a portion of said character is intersected by any of said scan line segments, and means responsive to the output signals from said sensing means to provide a manifestation indicative of the identity of the character scanned.

References Cited in the file of this patent

UNITED STATES PATENTS

| | | |
|---|---|---|
| 2,701,352 | Kingdon et al. | Feb. 1, 1955 |
| 2,838,602 | Sprick | June 10, 1958 |